United States Patent
Lee et al.

(10) Patent No.: US 11,798,423 B2
(45) Date of Patent: Oct. 24, 2023

(54) DRONE AND POSITIONING METHOD THEREOF, DRONE COMMUNICATION SYSTEM AND OPERATION METHOD THEREOF

(71) Applicant: Coretronic Intelligent Robotics Corporation, Hsin-Chu (TW)

(72) Inventors: Cheng-Shen Lee, Hsin-Chu (TW); Chih-Neng Tseng, Hsin-Chu (TW); Kuan-Chou Ko, Hsin-Chu (TW)

(73) Assignee: Coretronic Intelligent Robotics Corporation, Hsin-Chu (TW)

( * ) Notice: Subject to any disclaimer, the term of this patent is extended or adjusted under 35 U.S.C. 154(b) by 363 days.

(21) Appl. No.: 17/020,813

(22) Filed: Sep. 15, 2020

(65) Prior Publication Data

US 2021/0097868 A1  Apr. 1, 2021

(30) Foreign Application Priority Data

Sep. 27, 2019  (CN) .................. 201910924110.X

(51) Int. Cl.
  *G08G 5/00*  (2006.01)
  *H04B 17/318*  (2015.01)
  (Continued)

(52) U.S. Cl.
  CPC ......... *G08G 5/0013* (2013.01); *B64C 39/024* (2013.01); *G08G 5/0069* (2013.01);
  (Continued)

(58) Field of Classification Search
  CPC .. G08G 5/0013; G08G 5/0069; H04B 17/318; H04W 4/40; H04W 24/02;
  (Continued)

(56) References Cited

U.S. PATENT DOCUMENTS 7,471,954 B2  12/2008  Brachet et al.
8,054,219 B2  11/2011  Alizadeh-Shabdiz
(Continued)

FOREIGN PATENT DOCUMENTS

CN  1932549  3/2007
CN  106483499  3/2017
(Continued)

*Primary Examiner* — Peter D Nolan
*Assistant Examiner* — Roy Rhee
(74) *Attorney, Agent, or Firm* — JCIPRNET

(57) ABSTRACT

A drone and a positioning method thereof, a drone communication system and an operation method thereof are provided. The positioning method of the drone is applicable for a drone to cruise in a flight field. The positioning method includes the following steps: flying according to a destination coordinate in the flight field; sensing a plurality of base stations via a first wireless communication module to obtain a plurality of first radio wave signals of the plurality of base stations; positioning according to the plurality of first radio wave signals to determine a current coordinate of the drone; and flying toward the destination coordinate in the flight field according to the current coordinate. In this way, the drone is capable of reliably positioning to effectively perform automatic flight missions.

14 Claims, 6 Drawing Sheets

(51) Int. Cl.
  *B64C 39/02* (2023.01)
  *H04W 24/02* (2009.01)
  *H04W 4/40* (2018.01)
  *H04L 5/00* (2006.01)
  *B64U 50/19* (2023.01)

(52) U.S. Cl.
  CPC ......... *H04B 17/318* (2015.01); *H04L 5/0053* (2013.01); *H04W 4/40* (2018.02); *H04W 24/02* (2013.01); *B64U 50/19* (2023.01); *B64U 2201/104* (2023.01); *B64U 2201/20* (2023.01)

(58) Field of Classification Search
  CPC . B64C 39/024; H04L 5/0053; B64U 2201/20; B64U 50/19; B64U 2201/104
  See application file for complete search history.

(56) References Cited

U.S. PATENT DOCUMENTS

| | | | |
|---|---|---|---|
| 2016/0205560 A1* | 7/2016 | Hyslop | H04W 16/14 455/454 |
| 2018/0233055 A1* | 8/2018 | Damnjanovic | G01S 5/14 |
| 2019/0138013 A1* | 5/2019 | Wu | B64C 1/16 |
| 2022/0053285 A1* | 2/2022 | Shu | H04W 4/023 |

FOREIGN PATENT DOCUMENTS

| | | |
|---|---|---|
| CN | 108802713 | 11/2018 |
| CN | 109298396 | 2/2019 |
| CN | 110082719 | 8/2019 |
| WO | 2018171976 | 9/2018 |
| WO | 2019147785 | 8/2019 |

* cited by examiner

DRONE AND POSITIONING METHOD THEREOF, DRONE COMMUNICATION SYSTEM AND OPERATION METHOD THEREOF

CROSS-REFERENCE TO RELATED APPLICATION

This application claims the priority benefit of China application serial no. 201910924110.X, filed on Sep. 27, 2019. The entirety of the above-mentioned patent application is hereby incorporated by reference herein and made a part of this specification.

BACKGROUND

Field of the Invention

The invention relates to an unmanned aerial vehicle (UAV) and more particularly, to a drone and a positioning method thereof, a drone communication system and an operation method thereof.

Description of Related Art

In the current unmanned aerial vehicle (UAV) field, a general drone receives radio waves provided by at least three satellites using the global positioning system (GPS) technique for positioning, so as to obtain positioning information related to a current location of the drone. However, when the general drone flight is under bad weather or located in a special terrain environment with poor signal reception, the drone is prone to be influenced by interference with the reception of GPS signals or poor reception quality and fails to be positioned accurately. Accordingly, regarding how to provide the drone with a reliable position function to effectively perform automatic flight missions, several embodiments of solutions therefor are provided below.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention provides a drone and a positioning method thereof, a drone communication system and an operating method thereof that can provide the drone with a reliable positioning function to effectively perform automatic flight missions.

Other features and advantages of the invention can be further understood by the technical features disclosed in the invention.

To achieve one, part, or all of the objectives aforementioned or other objectives, an embodiment of the invention provides a positioning method of a drone applicable for the drone to cruise in a flight field. The positioning method includes the following steps: flying according to a destination coordinate in the flight field; sensing a plurality of base stations via a first wireless communication module to obtain a plurality of first radio wave signals of the plurality of base stations; positioning according to the plurality of first radio wave signals to determine a current coordinate of the drone; and flying toward the destination coordinate in the flight field according to the current coordinate.

To achieve one, part, or all of the objectives aforementioned or other objectives, an embodiment of the invention provides a drone including a processor and a first wireless communication module. The processor is configured to control the drone to fly according to a destination coordinate in a flight field. The first wireless communication module is coupled to the processor. The first wireless communication module is configured to sense a plurality of base stations to obtain a plurality of first radio wave signals of the plurality of base stations. The processor performs positioning according to the plurality of first radio wave signals to determine a current coordinate of the drone, and the processor controls the drone to fly toward the destination coordinate in the flight field according to the current coordinate.

To achieve one, part, or all of the objectives aforementioned or other objectives, an embodiment of the invention provides an operation method of a drone communication system applicable for obtaining a plurality of base station coordinates corresponding to a plurality of base stations in a flight field. The operation method includes the following steps: communicating with at least three base stations adjacent to a parking apron apparatus to obtain at least three base station coordinates of the at least three base stations; communicating with another base station adjacent to the at least three base stations through the at least three base stations; estimating another base station coordinate of the another base station according to the at least three base station coordinates of the at least three base stations; and storing the plurality of base station coordinates and providing the plurality of base station coordinates to a drone parked on the parking apron apparatus.

To achieve one, part, or all of the objectives aforementioned or other objectives, an embodiment of the invention provides a drone communication system including a drone, a plurality of base stations and a parking apron apparatus. The plurality of base stations are configured to form a flight field. The parking apron apparatus is configured to park the drone. The parking apron apparatus communicates with at least three of the base stations adjacent to the parking apron apparatus to obtain at least three base station coordinates of the at least three base stations. The parking apron apparatus communicates with another base station adjacent to the at least three base stations through the at least three base stations. The parking apron apparatus estimates another base station coordinate of the another base station according to the at least three base station coordinates of the at least three base stations and stores the plurality of base station coordinates to obtain the plurality of base stations to the drone.

Based on the above, the embodiments of the invention achieve at least one of the following advantages or effects. In the drone and the positioning method thereof, the drone communication system and the operating method thereof provided by the invention, the flight field of the drone can be formed by setting up the plurality of base stations, such that the drone can wirelessly communicate with at least a part of the plurality of base stations according to its current location to obtain the positioning information of the current location of the drone, thereby effectively performing automatic flight missions in the flight field.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
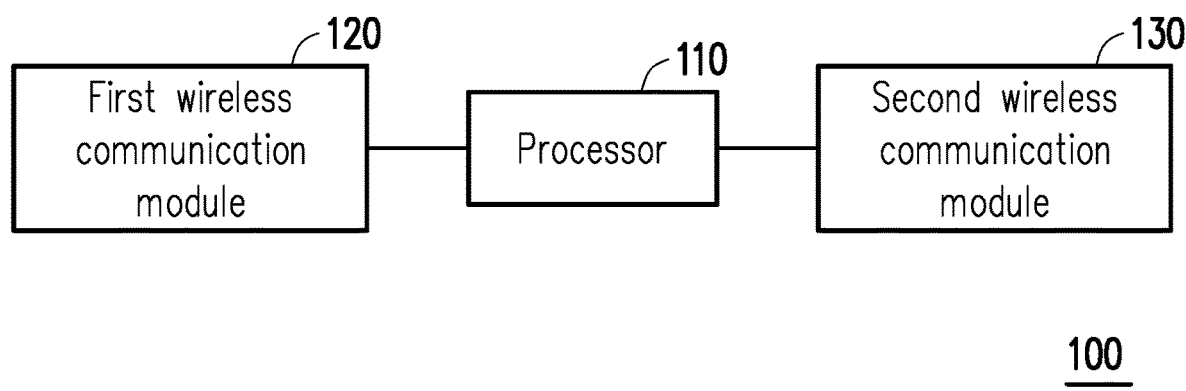
FIG. 1 is a schematic functional block diagram of a drone according to an embodiment of the invention.

FIG. 1 is a schematic functional block diagram of a drone according to an embodiment of the invention. Referring to FIG. 1, a drone 100 of the invention includes a processor 110, a first wireless communication module 120 and a second wireless communication module 130. In addition, the drone 100 further includes other necessary elements required by the drone 100, for example, a drone engine, a battery module, an airframe mechanism and a wing mechanism and so on (which are not shown), but details related to the other necessary elements required by the drone are not limited in the invention. The processor 110 is coupled to the first wireless communication module 120 and the second wireless communication module 130. In the present embodiment, the processor 110 may be a central processing unit (CPU) or any other general or specific purpose programmable microprocessor, a digital signal processor (DSP), a programmable controller, an application specific integrated circuit (ASIC), a programmable logic device (PLD), other similar processing devices, or a combination of these devices. The drone 100 may further include a memory, and the memory is configured to store related control programs, positioning data and so on for the processor 110 to access and execute. In the present embodiment, the processor 110 is at least configured to control the drone 100 to fly toward a destination coordinate in a specific flight field.

In the present embodiment, the first wireless communication module 120 may wirelessly communicate with ground base stations within a communication range by using, for example, a wireless communication standard, such as general packet radio service (GPRS), code division multiple access (CDMA), digital mobile radio (DMR), spread spectrum communication (SSC) or wireless LAN (WLAN). In the present embodiment, the drone 100 may receive radio wave signals provided by the ground base stations using the first wireless communication module 120 to at least obtain current positioning information (coordinate information) of the drone 100.

In the present embodiment, the second wireless communication module 130 is configured to support a global positioning system (GPS) to wirelessly communicate with a satellite system. In the present embodiment, the drone 100 may receive the radio wave signals provided by the satellite system using the second wireless communication module 130 to at least obtain the current positioning information of the drone 100 through the GPS system. In an embodiment, when the drone 100 is flying, the drone 100 first continuously communicates with the satellite system via the second wireless communication module 130 to continuously (time-sequentially) update the current positioning information of the drone 100, wherein the current positioning information is a GPS coordinate. Thus, the processor 110 of the drone 100 may manipulate the drone 100 to fly toward a destination (coordinate) according to the current positioning information. Meanwhile, the processor 110 of the drone 100 may time-sequentially detect whether the second wireless communication module 130 receives a GPS signal from the satellite system. If the drone 100 loses the communication with the satellite system during the process of flight, the drone 100 has a switching circuit to immediately switch to communicate with the ground base stations using the first wireless communication module 120, thereby continuously updating the current positioning information of the drone 100. However, in another embodiment, the drone 100 may have only the first wireless communication module 120, and thus, the drone 100 only communicates with the ground base stations during the process of flight to continuously update the current positioning information of the drone 100.

Figure 2:
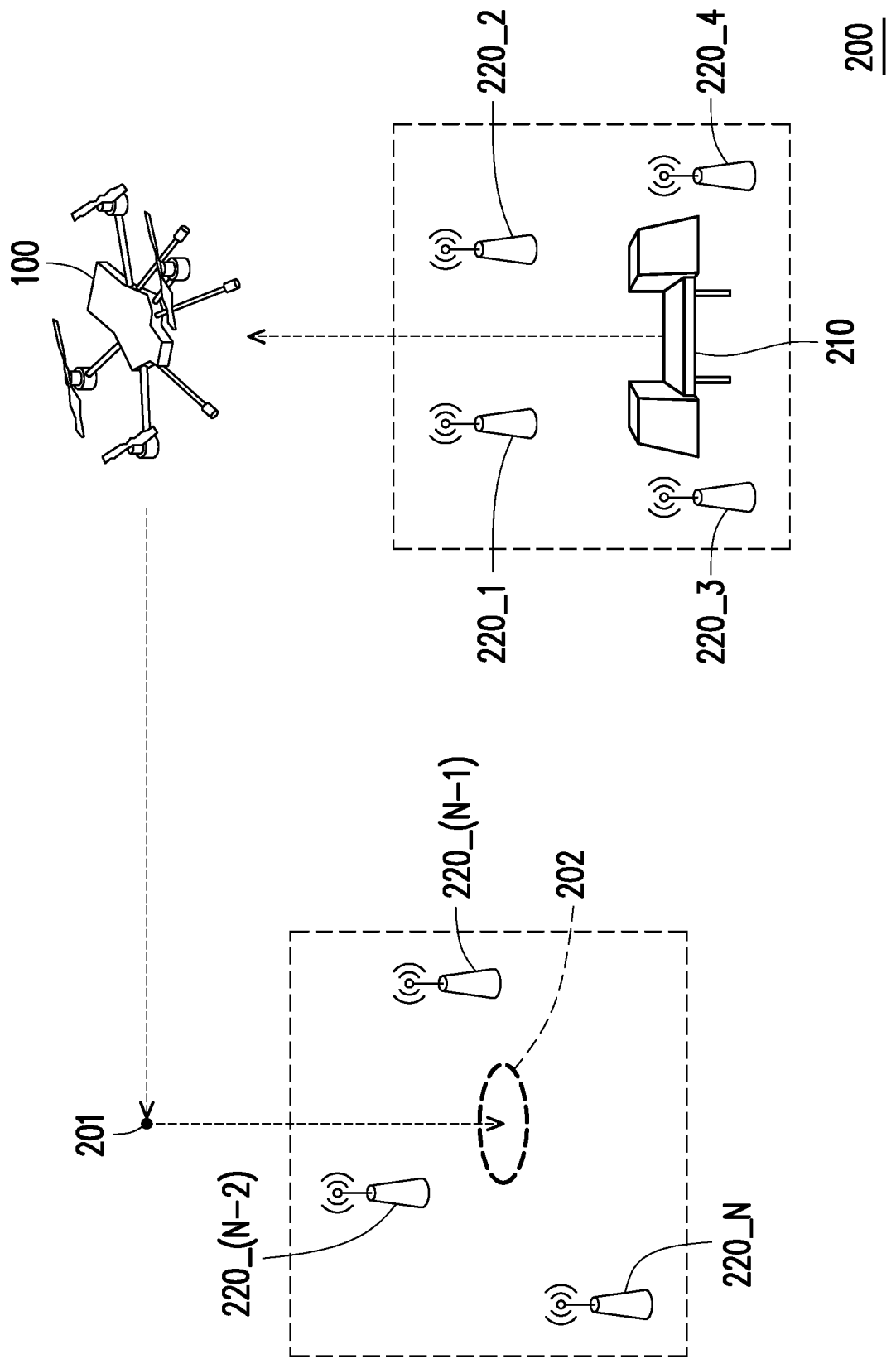
FIG. 2 is a schematic structural diagram of a drone communication system according to an embodiment of the invention.

FIG. 2 is a schematic structural diagram of a drone communication system according to an embodiment of the invention. Referring to FIG. 1 and FIG. 2, a drone communication system 200 includes the drone 100, a parking apron apparatus 210 and a plurality of base stations 220_1 to 220_N, wherein N is a positive integer greater than 1. In the present embodiment, the parking apron apparatus 210 may include a processor, a memory, a wireless communication module, a battery module and so on. The drone parking apparatus 210 is configured for takeoff, landing and charging of the drone 100 and may communicate with the drone 100 and the base stations 220_1 to 220_4 adjacent to the periphery of the parking apron apparatus 210 to obtain a plurality of base station coordinates of the at least three base stations 220_1 to 220_4. The base stations 220_1 to 220_4 may respectively record the base station coordinates thereof. The parking apron apparatus 210 may further extend the communication with other base stations through the base stations 220_1 to 220_4. In other words, the base stations 220_1 to 220_N themselves obtain communication with the adjacent base stations 220_1 to 220_N through sending radio wave signals, so as to obtain the coordinates of other of the adjacent base stations 220_1 to 220_N by means of radio wave positioning estimation. Thus, the parking apron apparatus 210 may obtain not only positioning information thereof, but also a plurality of base station coordinates of the base stations 220_1 to 220_N. The parking apron apparatus 210 may provide the base station coordinates of the base stations 220_1 to 220_N respectively to the drone 100. In the present embodiment, an overall communication zone covered by the base stations 220_1 to 220_N may form a flight field of the drone 100 for the drone 100 to fly toward the destination in this flight field.

In the present embodiment, a plurality of communication ranges of the plurality of base stations 220_1 to 220_N are at least partially overlapped, and any location in the flight field is covered by at least three communication ranges provided by at least three base stations. It is assumed that in the present embodiment, the flight field formed by the base stations 220_1 to 220_N or the environment where the drone 100 flies is a special terrain or a specific area, such as a canyon or rainforest, which is incapable of communicating with the satellite system. In the present embodiment, when the drone 100 takes off from the parking apron apparatus 210 and flies in the flight field, the drone 100 may obtain a current coordinate of the current drone 100 by means of triangulation, wherein the current coordinate is a GPS coordinate. In the present embodiment, the drone 100 may calculates distances between the drone 100 and at least three adjacent base stations based on at least one of a time of arrival (TOA), time difference of arrival (TDOA) and a received signal strength indicator (RSSI) positioning methods.

The calculation of the distance between the drone 100 and an adjacent base station is taken as an example. In an embodiment, the processor 110 of the drone 100 may estimate a distance $D_{TOA}$ between the drone 100 and the adjacent base station based on the TOA positioning method and estimate a distance $D_{RSSI}$ between the drone 100 and the adjacent base station based on the RSSI positioning method. Additionally, the processor 110 of the drone 100 may perform the calculation as indicated by Formula (1) in a weighted-average manner together with related coordinate conversion to obtain a distance D (a composite distance estimated value) between the drone 100 and the adjacent base station. By deducing in the same way, the processor 110 may calculate distances respectively between the drone 100 and the at least three adjacent base stations through the calculation as indicated by Formula (1). In Formula (1) below, symbols A and B are constants.

$$D = \frac{A*D_{TOA} + B*D_{RSSI}}{A+B} \quad \text{Formula (1)}$$

Furthermore, in the present embodiment, when the drone 100 flies to a certain location 201 in the sky above a destination 202 (a destination coordinate), the drone 100 may further calculate at least one of a phase, a phase angle and a height between the drone 100 (coordinate of the drone) and the destination 202 (the destination coordinate) based on a channel state information (CSI) positioning algorithm, and the drone 100 may land at the location 202 (the destination coordinate) according to the at least one of the phase, the phase angle and the height. In other words, when the drone 100 is, for example, capable of communicating with the base stations 220_(N−2), 220_(N−1) and 220_N, it indicates that the drone 100 flies to the sky above the destination 202 (the destination coordinate), and thus, the drone 100 may calculate more detailed current positioning information, so as to accurately land to the destination 202 (the destination coordinate).

Figure 3:
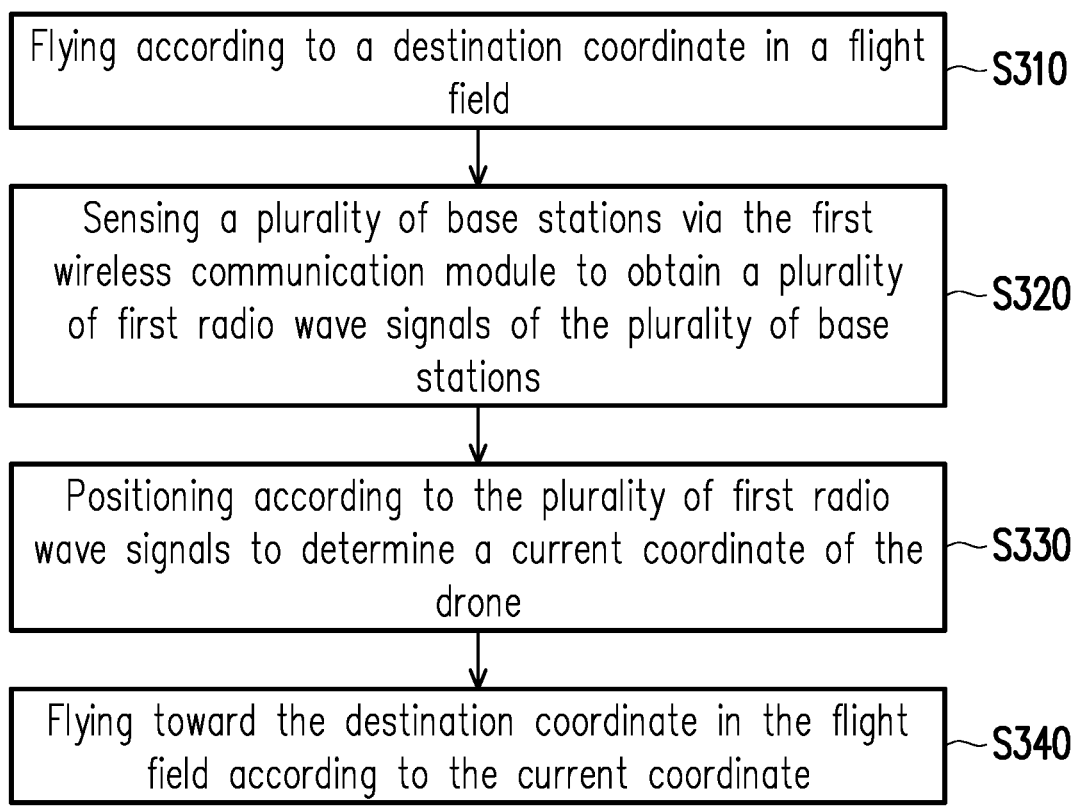
FIG. 3 is a flowchart of a positioning method of a drone according to an embodiment of the invention.

FIG. 3 is a flowchart of a positioning method of a drone according to an embodiment of the invention. Referring to FIG. 1 to FIG. 3, the positioning method of the present embodiment is at least applicable to the drone 100 illustrated in FIG. 1 and FIG. 2. The drone 100 may perform steps S310 to S340 as follows. In step S310, the drone 100 flies according to a destination coordinate in the flight field. In step S320, the drone 100 senses the plurality of base stations 220_1 to 220_N via the first wireless communication module 120 to obtain a plurality of first radio wave signals of the base stations 220_1 to 220_N. In the present embodiment, the drone 100 may obtain the base station coordinates of the base stations 220_1 to 220_N respectively in advance through the parking apron apparatus 210, or alternatively, the base stations 220_1 to 220_N provide the base station coordinates respectively to the drone 100 through the plurality of first radio wave signals. In step S330, the drone 100 is positioned according to the plurality of first radio wave signals to determine the current coordinate of the drone 100. Namely, the processor 110 of the drone 100 may first calculate a plurality of distances respectively between the drone 100 and the plurality of base stations adjacent thereto according to the plurality of first radio signals. The plurality of distances may be obtained by the calculation as indicated by Formula (1). Then, the processor 110 of the drone 100 may calculate the current coordinate of the drone 100 by means of triangulation according to the plurality of coordinates of and the plurality of distances with respect to the adjacent base stations. In step S340, the drone 100 flies toward the destination coordinate according to the current coordinate in the flight field. Thus, the drone 100 of the present embodiment may effectively and accurately fly toward the destination in the flight field formed by the plurality of base stations 220_1 to 220_N.

Figure 4:
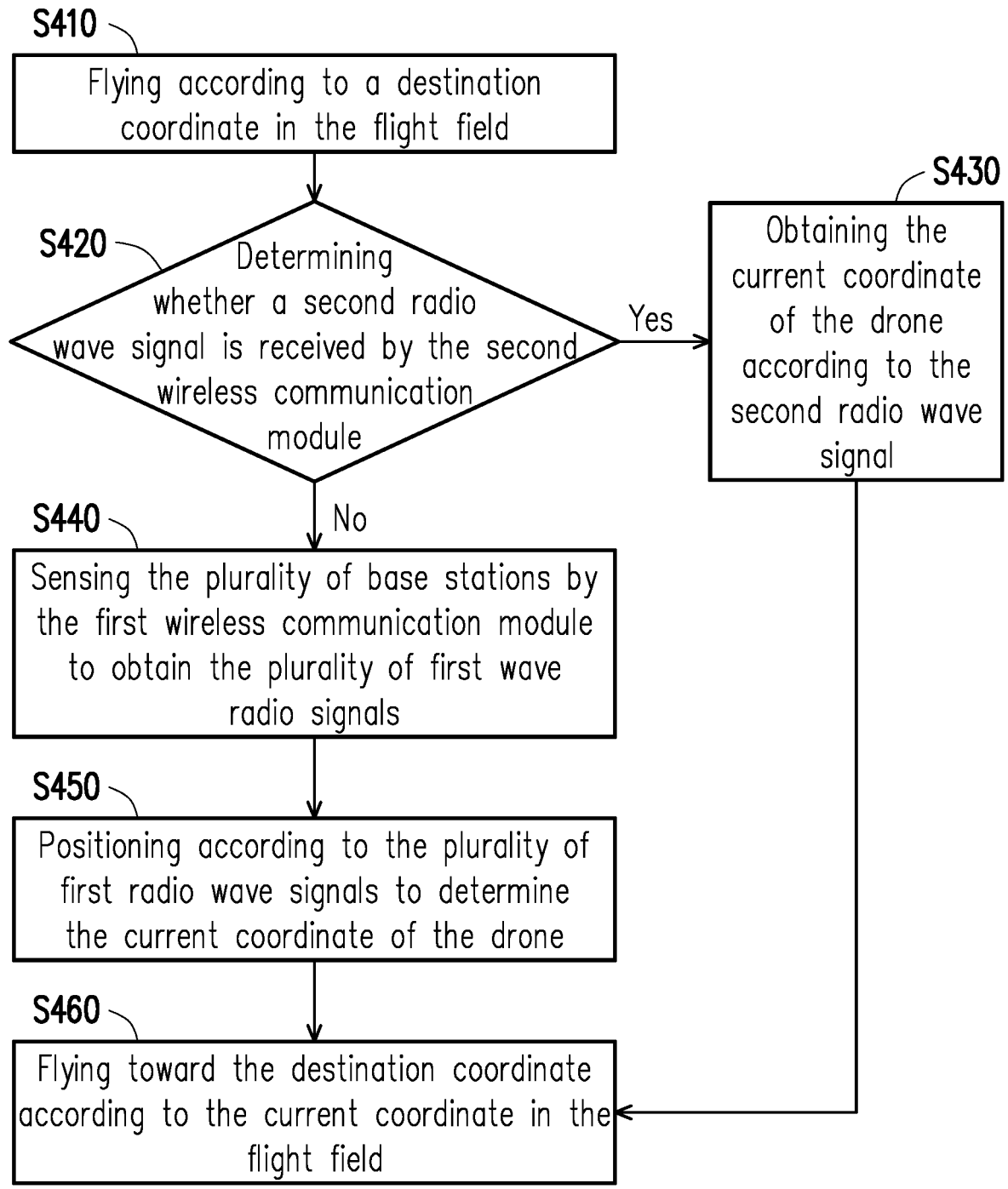
FIG. 4 is a flowchart of a positioning method of a drone according to another embodiment of the invention.

FIG. 4 is a flowchart of a positioning method of a drone according to another embodiment of the invention. Referring to FIG. 1, FIG. 2 and FIG. 4, the positioning method of the present embodiment is at least applicable to the drone 100 illustrated in FIG. 1 and FIG. 2. In comparison with the embodiment as illustrated in FIG. 3, the positioning method of the drone of the present embodiment may further perform the positioning with the use of the second wireless communication module 130 of the drone 100. The drone 100 may perform steps S410 to S460 as follows. In step S410, the drone 100 flies according to a destination coordinate in the flight field. In step S420, the drone 100 determines whether a second radio wave signal is received by the second wireless communication module 130. In detail, the processor 110 of the drone 100 may time-sequentially detect whether the second wireless communication module 130 receives any GPS signal from the satellite system, wherein the second radio wave signal is provided by the satellite system. If yes, the drone 100 performs step S430. In step S430, the drone 100 obtains the current coordinate of the drone according to the second radio wave signal, wherein the current coordinate is a GPS coordinate. And, in step S460, the drone 100 flies toward the destination coordinate according to the current coordinate in the flight field.

If no, the drone 100 performs step S440. In step S440, the drone 100 senses the plurality of adjacent base stations 220_1 to 220_N respectively via the first wireless communication module 120 to obtain the plurality of first radio wave signals of the base stations 220_1 to 220_N. In the present embodiment, the drone 100 may obtain the base station coordinates of the base stations 220_1 to 220_N respectively in advance through the parking apron apparatus 210, or alternatively, the base stations 220_1 to 220_N may provide the base station coordinates to the drone 100 respectively through the plurality of first radio wave signals. In step S450, the drone 100 is positioned according to the plurality of first radio wave signals to determine the current coordinate of the drone 100. In step S460, the drone 100 flies toward the destination coordinate according to the current coordinate in the flight field. Thus, the drone 100 of the present embodiment may effectively and accurately fly toward the destination in the flight field formed by the plurality of base stations 220_1 to 220_N.

In other words, the drone 100 of the present embodiment may preferentially determine whether GPS positioning information is obtained through the satellite system, and when the drone 100 fails to obtain the GPS positioning information through the satellite system, the drone 100 is switched to communicate with the plurality of ground base stations in the flight field to obtain positioning information of the drone 100, such that the drone 100 may effectively and accurately fly toward the destination in the flight field formed by the plurality of base stations 220_1 to 220_N.

Figure 5:
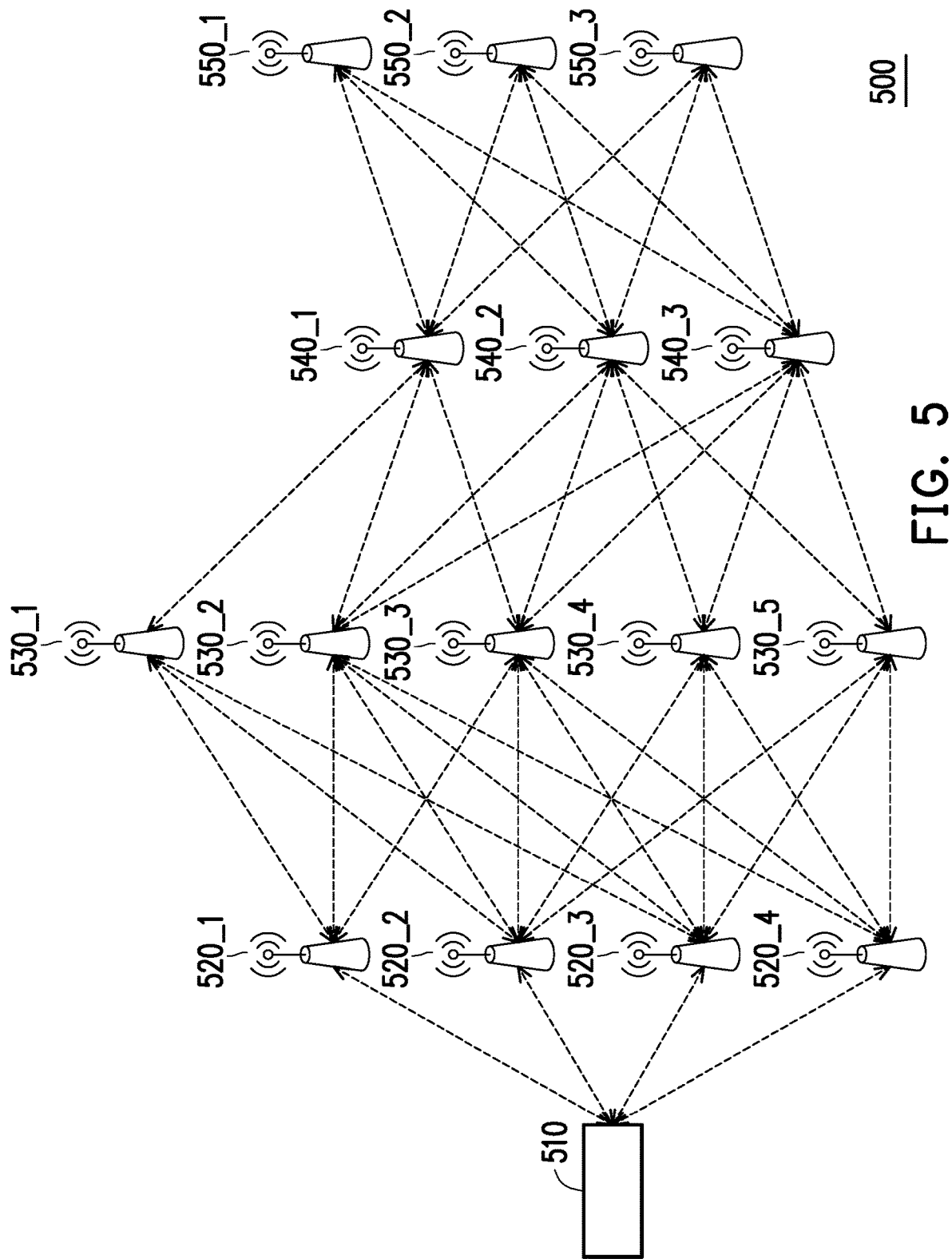
FIG. 5 is a schematic diagram of the communication between a parking apron apparatus and a plurality of base stations according to an embodiment of the invention.

FIG. 5 is a schematic diagram of the communication between a parking apron apparatus and a plurality of base stations according to an embodiment of the invention. Referring to FIG. 5, the present embodiment provides a method of building and operating a drone communication system. In the present embodiment, a drone communication system 500 includes a parking apron apparatus 510 and a plurality of base stations 520_1 to 520_4, 530_1 to 530_5, 540_1 to 540_3 and 550_1 to 550_3. Each of the base stations 520_1 to 520_4, 530_1 to 530_5, 540_1 to 540_3 and 550_1 to 550_3 includes a battery module to perform communication according to power supplied by each of the battery modules. In the present embodiment, the base stations 520_1 to 520_4, 530_1 to 530_5, 540_1 to 540_3 and 550_1 to 550_3 may be, for example, built in a special terrain or a specific area which is incapable of communicating with the satellite system.

In the present embodiment, when a user sets up the parking apron apparatus 510 and the base stations 520_1 to 520_4, the parking apron apparatus 510 may be adjacent to the base stations 520_1 to 520_4. However, in an embodiment, because the parking apron apparatus 510 may calculate an apron coordinate of the parking apron apparatus 510 according to at least three base station coordinates, the parking apron apparatus 510 may be adjacent to at least three base stations, but the number of the base stations is not limited to that illustrated in FIG. 5. In the present embodiment, the parking apron apparatus 510 may communicate with another plurality of base stations 530_1 to 530_5 adjacent to these base stations 520_1 to 520_4 through the base stations 520_1 to 520_4 to estimate base station coordinates of the another plurality of base stations 530_1 to 530_5 according to any corresponding at least three base station coordinates of these base stations 520_1 to 520_4. By deducing in the same way, the parking apron apparatus 510 may communicate with the plurality of base stations 540_1 to 530_5 adjacent to these base stations 530_1 to 530_5 through the base stations 520_1 to 520_4 and 530_1 to 530_5 and may further communicate with the plurality of base stations 550_1 to 530_5 adjacent to these base stations 540_1 to 530_5 through the base stations 520_1 to 520_4, 530_1 to 530_5 and 540_1 to 530_3. Thus, the parking apron apparatus 510 may automatically obtain the base station coordinates of all the base stations one by one.

For example, the base stations 520_1 to 520_4 may be those that are first set up and respectively have known base station coordinates. Based on a distance relation with the parking apron apparatus 510, the base stations 520_1 to 520_4 may wirelessly communicate with the satellite system to obtain GPS coordinates of the base stations 520_1 to 520_4 respectively. Then, the base station 530_1 adjacent to the base stations 520_1 to 520_4 may at least is covered by three communication ranges provided by the base stations 520_1 to 520_3. Thus, the parking apron apparatus 510 may, for example, calculate three distances between the base station 530_1 and the corresponding three base stations 520_1 to 520_3 based on at least one of a TOA, a TDOA and an RSSI positioning methods. The aforementioned three distances may be obtained in a calculation manner similar to the calculation as indicated by Formula (1) above. Then, the parking apron apparatus 510 may estimate a GPS coordinate of the base station 530_1 according to the three GPS coordinates of the base station 520_1 to 520_3 and the corresponding three distances. By deducing in the same way, the parking apron apparatus 510 may automatically obtain the base station coordinates of the base stations 520_1 to 520_4, 530_1 to 530_5, 540_1 to 540_3 and 550_1 to 550_3 respectively to automatically and effectively build the flight field for the drone to fly. However, the connection relation and the configuration manner of the base stations 520_1 to 520_4, 530_1 to 530_5, 540_1 to 540_3 and 550_1 to 550_3 illustrated in FIG. 5 are merely for illustrating the communication manner of the drone communication system 500 of one of the embodiments of the invention, which construes no limitations to the invention.

Additionally, in an embodiment, if one of the base stations 520_1 to 520_4, 530_1 to 530_5, 540_1 to 540_3 and 550_1 to 550_3 is capable of wirelessly communicating with the satellite system, the one of the base stations 520_1 to 520_4, 530_1 to 530_5, 540_1 to 540_3 and 550_1 to 550_3 may obtain GPS coordinates directly from the satellite system and directly provide the base station coordinates to the parking apron apparatus 510, such that the parking apron apparatus 510 no longer has to estimate the base station coordinates of the base stations capable of communicating with the satellite system. Additionally, the parking apron apparatus 510 may further correct an accumulative error of other GPS coordinates obtained through estimation according to a GPS coordinate of a certain base station provided by the satellite system. Additionally, in an embodiment, each of the base stations 520_1 to 520_4, 530_1 to 530_5, 540_1 to 540_3 and 550_1 to 550_3 may also obtain the GPS coordinate thereof by the user using a measurement device, such as a laser range finder (LRF), an electronic compass or a barometer.

Figure 6:
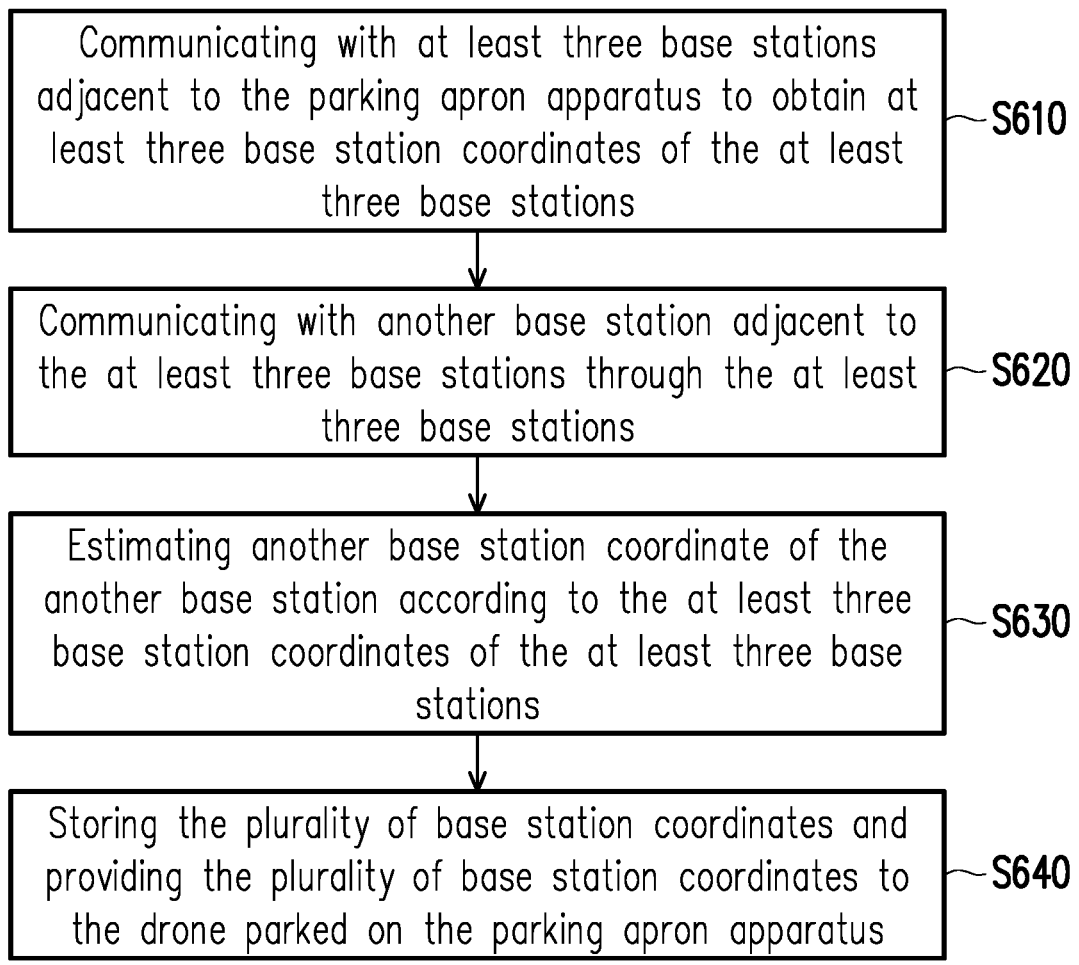
FIG. 6 is a flowchart of an operation method of a drone communication system according to an embodiment of the invention.

FIG. 6 is a flowchart of an operation method of a drone communication system according to an embodiment of the invention. The positioning method of the present embodiment is at least applicable to the drone communication systems 200 and 500 illustrated in FIG. 2 and FIG. 5. Referring to FIG. 2 and FIG. 6, the parking apron apparatus 210 may perform steps S610 to S640 as follows. In step S610, the parking apron apparatus 210 communicates with at least three of the base stations 220_1 to 220_4 adjacent to the parking apron apparatus 210 to obtain at least three base station coordinates of the at least three base stations. In step S620, the parking apron apparatus 210 communicates with another base station adjacent to the at least three base stations through the at least three base stations. In step S630, the parking apron apparatus 210 estimates another base station coordinate of the another base station according to the at least three base station coordinates of the at least three base stations. In step S640, the parking apron apparatus 210 stores the plurality of base station coordinates and provides the plurality of base station coordinates to the drone 100 parked on the parking apron apparatus 210. Thus, the operation method of the present embodiment may automatically and effectively build the drone communication system 200 and build the flight field for the drone 100 to fly.

In light of the foregoing, in the drone and the positioning method thereof, the drone communication system and the operating method thereof provided by the invention, the flight field of the drone can be formed by setting up the plurality of base stations, and the parking apron apparatus can automatically obtain the plurality of base station coordinates of the plurality of base stations. The parking apron apparatus can provide the plurality of base station coordinates to the drone. Thus, if the drone fails to obtain the GPS coordinate through the satellite system during the process of flight, the drone can wirelessly communicate with at least a part of the plurality of base stations according to its current location to continuously update the positioning information of the current location of the drone, such that the drone can accurately perform automatic flight missions in the flight field.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A positioning method of a drone, adapted for the drone cruising in a flight field, the positioning method comprising steps of:
   flying according to a destination coordinate in the flight field;
   sensing, a plurality of base stations via a first wireless communication module, to obtain a plurality of first radio wave signals of the plurality of base stations;
   positioning, according to the plurality of first radio wave signals, to determine a current coordinate of the drone; and
   flying toward the destination coordinate in the flight field according to the current coordinate,
   wherein the plurality of base stations respectively provide a plurality of coordinates of the plurality of base stations to the drone through the plurality of first radio wave signals,
   wherein the step of positioning, according to the plurality of first radio wave signals, to determine the current coordinate of the drone comprises steps of:
      calculating a plurality of distances respectively between the drone and the plurality of base stations according to the plurality of first radio wave signals; and
      calculating the current coordinate of the drone according to the plurality of coordinates of the plurality of base stations and the plurality of distances,
   wherein the step of calculating the plurality of distances respectively between the drone and the plurality of base stations according to the plurality of first radio wave signals comprises steps of:
      estimating a distance $D_{TOA}$ between the drone and one of the adjacent base stations based on a time of arrival positioning method;
      estimating a distance $D_{RSSI}$ between the drone and the one of the adjacent base stations based on a received signal strength indication positioning method; and
      obtaining a distance D between the drone and the one of the adjacent base stations by $D = A \times D_{TOA} + B \times D_{RSSI}/A+B$, wherein symbols A and B are constants.

2. The positioning method according to claim 1, wherein a plurality of communication ranges of the plurality of base stations are at least partially overlapped, and any location in the flight field is covered by at least three of the communication ranges provided by at least three of the base stations.

3. The positioning method according to claim 1, wherein the plurality of coordinates are a plurality of global positioning system (GPS) coordinates.

4. The positioning method according to claim 1, further comprising steps of:
   when the drone is located in the sky above the destination coordinate, calculating at least one of a phase, a phase angle and a height between a coordinate of the drone and the destination coordinate; and
   landing at the location of the destination coordinate according to the at least one of the phase, the phase angle and the height.

5. The positioning method according to claim 4, wherein the at least one of the phase, the phase angle and the height is calculated by the drone based on a channel state information (CSI) positioning algorithm.

6. The positioning method according to claim 1, further comprising steps of:
   when a second radio wave signal is received via a second wireless communication module, obtaining the current coordinate of the drone; and flying toward the destination coordinate in the flight field according to the current coordinate.

7. The positioning method according to claim 6, wherein the second radio wave signal is a GPS signal, and the current coordinate is a GPS coordinate.

8. A drone, comprising:
a processor; and
a first wireless communication module, wherein the first wireless communication module is coupled to the processor, and the first wireless communication module is configured to sense a plurality of base stations to obtain a plurality of first radio wave signals of the plurality of base stations,
wherein the processor is configured to execute steps of:
controlling the drone to fly according to a destination coordinate in a flight field;
positioning, according to the plurality of first radio wave signals, to determine a current coordinate of the drone; and
controlling the drone to fly toward the destination coordinate in the flight field according to the current coordinate in the flight field,
wherein the plurality of base stations respectively provide a plurality of coordinates of the plurality of base stations to the drone through the plurality of first radio wave signals,
wherein during the step of positioning, according to the plurality of first radio wave signals, to determine the current coordinate of the drone, the processor is configured to execute steps of:
calculating a plurality of distances respectively between the drone and the plurality of base stations according to the plurality of first radio wave signals; and
calculating the current coordinate of the drone according to the plurality of coordinates of the plurality of base stations and the plurality of distances,
wherein during the step of calculating the plurality of distances respectively between the drone and the plurality of base stations according to the plurality of first radio wave signals, the processor is configured to execute steps of:
estimating a distance $D_{TOA}$ between the drone and one of the adjacent base stations based on a time of arrival positioning method;
estimating a distance $D_{RSSI}$ between the drone and the one of the adjacent base stations based on a received signal strength indication positioning method; and
obtaining a distance D between the drone and the one of the adjacent base stations by $D=A\times D_{TOA}+B\times D_{RSSI}/A+B$, wherein symbols A and B are constants.

9. The drone according to claim 8, wherein a plurality of communication ranges of the plurality of base stations are at least partially overlapped, and any location in the flight field is covered by at least three of the communication ranges provided by at least three of the base stations.

10. The drone according to claim 8, wherein the plurality of coordinates are a plurality of GPS coordinates.

11. The drone according to claim 8, wherein the processor is further configured to execute steps of:
when the drone is located in the sky above the destination coordinate, calculating at least one of a phase, a phase angle and a height between a coordinate of the drone and the destination coordinate; and
controlling the drone to land at the location of the destination coordinate according to the at least one of the phase, the phase angle and the height.

12. The drone according to claim 11, wherein the drone calculates the at least one of the phase, the phase angle and the height based on a CSI positioning algorithm.

13. The drone according to claim 8, further comprising:
a second wireless communication module, coupled to the processor,
wherein the processor is further configured to execute steps of:
when the second wireless communication module receives a second radio wave signal, obtaining the current coordinate of the drone according to the second radio wave signal; and
controlling the drone to fly toward the destination coordinate in the flight field according to the current coordinate.

14. The drone according to claim 13, wherein the second radio wave signal is a GPS signal, and the current coordinate is a GPS coordinate.

* * * * *